(12) United States Patent
Suo

(10) Patent No.: US 9,069,379 B2
(45) Date of Patent: Jun. 30, 2015

(54) FLEXIBLE DISPLAY SCREEN AND METHOD AND APPARATUS FOR CONTROLLING THE SAME

(75) Inventor: Shengjun Suo, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 42 days.

(21) Appl. No.: 14/234,486

(22) PCT Filed: Jul. 20, 2012

(86) PCT No.: PCT/CN2012/078924
§ 371 (c)(1),
(2), (4) Date: Jan. 23, 2014

(87) PCT Pub. No.: WO2013/017021
PCT Pub. Date: Feb. 7, 2013

(65) Prior Publication Data
US 2014/0191956 A1 Jul. 10, 2014

(30) Foreign Application Priority Data
Aug. 1, 2011 (CN) .......................... 2011 1 0218188

(51) Int. Cl.
*G06F 3/01* (2006.01)
*G09G 3/20* (2006.01)
*G06F 1/16* (2006.01)

(52) U.S. Cl.
CPC ................ *G06F 3/01* (2013.01); *G09G 3/2092* (2013.01); *G09G 2354/00* (2013.01); *G09G 2380/02* (2013.01); *G06F 1/1652* (2013.01)

(58) Field of Classification Search
CPC combination set(s) only.
See application file for complete search history.

(56) References Cited

U.S. PATENT DOCUMENTS

| 7,523,856 B2 * | 4/2009 | Block et al. ............... 235/379 |
| 2011/0134144 A1 | 6/2011 | Moriwaki |
| 2012/0075166 A1 * | 3/2012 | Marti et al. .................. 345/1.1 |

FOREIGN PATENT DOCUMENTS

| CN | 102087824 A | 6/2011 |
| JP | 8114430 A | 5/1996 |
| JP | 8211356 A | 8/1996 |
| KR | 20060107958 A | 10/2006 |

OTHER PUBLICATIONS

English language translation of Abstract of Chinese Patent No. 102087824 A.

(Continued)

*Primary Examiner* — Charles V Hicks
*Assistant Examiner* — Jeffrey S Steinberg

(57) ABSTRACT

A method for controlling a flexible display screen having a first curvature is provided. The method comprises: detecting target information to obtain a detection result (101); querying a database based on the detection result to determine whether the first curvature is included in a preset range of curvature values corresponding to the detection result (102), the database storing a correspondence between a range of target information values and a range of curvature values; and generating a control command to adjust the flexible display screen to a second curvature different from the first curvature when the first curvature is not included in the preset range of curvature values (103). With the present invention, the curvature of the flexible display screen can be adjusted as desired, such that a user of the display screen can have an optimized view angle. The present application solves a problem in the prior art that the curvature of the flexible display screen cannot be adjusted as desired and avoids unclear view of a picture due to view angle.

11 Claims, 2 Drawing Sheets

(56) References Cited

OTHER PUBLICATIONS

English language translation of Abstract of Korean Patent No. 20060107958 A.

English language translation of Abstract of Japanese Patent No. 8211356 A.

English language translation of Abstract of Japanese Patent No. 8114430 A.

* cited by examiner

FLEXIBLE DISPLAY SCREEN AND METHOD AND APPARATUS FOR CONTROLLING THE SAME

CROSS REFERENCE TO RELATED APPLICATIONS

This application is based on International Application No. PCT/CN2012/078924 filed on Jul. 20, 2012, which claims priority to Chinese National Application No. 201110218188.3, filed on Aug. 1, 2011, the contents of which are incorporated herein by reference.

TECHNICAL FIELD

The present invention relates to a technical field of display screen, and more particularly, to a method and apparatus for controlling a flexible display screen and a flexible display screen using the same.

BACKGROUND

Cathode Ray Tube (CRT) displays and currently popular Liquid Crystal Displays (LCDs) are, in nature, traditional rigid display screens.

In accordance with a principle of technological evolution, display systems are evolved, following an evolution law, from a single rigid system to a hinged dual-system and then to a flexible system. Currently available flexible display techniques mainly include Organic Light-Emitting Diode (OLED) technique, e-paper technique and the like.

A flexible display screen, also known as flexible display or curved display, is a bendable/deformable display device including a flexible, visible panel made of a flexible material. The flexible display screen is the most promising trend in the display technology. It is expected that a rollable PDA or e-book reader will be developed in a near future and a large dimension wall hanging flexible display will become a reality soon.

While a flexible display screen can have a particular curvature, this curvature is preset during its manufacture. Therefore, it becomes a problem when it is desired to adjust the curvature of a flexible display screen.

SUMMARY

Embodiments of the present invention provide a method and apparatus for controlling a flexible display screen as well as a flexible display screen, capable of adjusting the curvature of the flexible display screen as desired.

According to an aspect of the present invention, a method for controlling a flexible display screen is provided. The flexible display screen has a first curvature. The method comprises steps of: detecting target information to obtain a detection result; querying a database based on the detection result to determine whether the first curvature is included in a preset range of curvature values corresponding to the detection result, the database storing a correspondence between a range of target information values and a range of curvature values; and generating a control command to adjust the flexible display screen to a second curvature different from the first curvature when the first curvature is not included in the preset range of curvature values.

According to another aspect of the present invention, an apparatus for controlling a flexible display screen is provided. The flexible display screen has a first curvature. The apparatus comprises: a detection unit adapted to detect target information to obtain a detection result; a determination unit adapted to query a database based on the detection result to determine whether the first curvature is included in a preset range of curvature values corresponding to the detection result, the database storing a correspondence between a range of target information values and a range of curvature values; and an adjustment unit adapted to generate a control command to adjust the flexible display screen to a second curvature different from the first curvature when the first curvature is not included in the preset range of curvature values.

According to yet another aspect of the present invention, a flexible display screen is provided. The flexible display screen has a first curvature. The flexible display screen comprises: a detection unit adapted to detect target information to obtain a detection result; a storage unit having a database storing a correspondence between a range of target information values and a range of curvature values; and a processing unit adapted to query the database based on the detection result to determine whether the first curvature is included in a preset range of curvature values corresponding to the detection result, and generate a control command to adjust the flexible display screen to a second curvature different from the first curvature when the first curvature is not included in the preset range of curvature values.

With the embodiments of the present invention, the curvature of the flexible display screen can be adjusted as desired, such that a user of the display screen can have an optimized view angle. The present application solves a problem in the prior art that the curvature of the flexible display screen cannot be adjusted as desired and avoids unclear view of a picture due to view angle.

BRIEF DESCRIPTION OF THE DRAWINGS

In order to illustrate the solutions according to the embodiments of the present application or the prior art in further detail, the figures used for description of the embodiments or the prior art will be introduced briefly here. It is to be noted that the figures described below only illustrate some of the embodiments of the present invention and further figures can be derived by those skilled in the art from these figures without applying any inventive skills.

DETAILED DESCRIPTION OF THE EMBODIMENTS

The solutions according to the embodiments of the present invention will be described clearly and completely in the following with reference to the figures associated with the embodiments. Apparently the embodiments described below are not exhaustive. Further embodiments can be derived by those skilled in the art from the teaching of the present invention without applying any inventive skills and all these embodiments are to be encompassed by the scope of the present invention.

Figure 1:
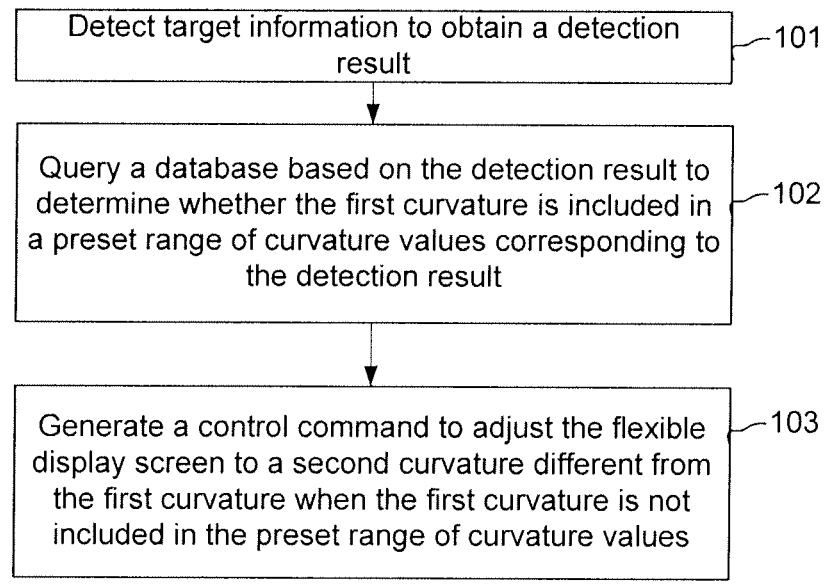
FIG. 1 is a flowchart illustrating a method for controlling a flexible display screen according to an embodiment of the present invention.

Reference is now made to FIG. 1, which is a flowchart illustrating a method for controlling a flexible display screen according to an embodiment of the present invention. In this example, the flexible display screen has a first curvature initially. The method can include the following steps.

At step 101, target information is detected to obtain a detection result.

At step 102, a database is queried based on the detection result to determine whether the first curvature is included in a preset range of curvature values corresponding to the detection result. Here the database stores a correspondence between a range of target information values and a range of curvature values.

At step 103, a control command is generated to adjust the flexible display screen to a second curvature different from the first curvature if the first curvature is not included in the preset range of curvature values.

Of course, if the current first curvature is included in the preset range of curvature values, there is no need to adjust the display screen.

It is to be noted here that, in a possible embodiment, the target information can indicate a distance between a center of the flexible display screen and a first user and the detection result can indicate a first distance between the center of the flexible display screen and the first user. In this case, the step of querying the database based on the detection result to determine whether the first curvature is included in the preset range of curvature values corresponding to the detection result can include: querying the database based on the first distance to determine whether the current first curvature of the flexible display screen is included in the preset range of curvature values. Here the database stores a correspondence between a range of distance values and a range of curvature values.

For example, the information shown in Table 1 below can be stored in the database in advance.

TABLE 1

| No. | Range of Distance Values (in centimeters) | Range of Curvature Values (in degrees (n = 5)) |
|---|---|---|
| 1 | 0-10 | A1-An |
| 2 | 10-20 | B1-Bn |
| ... | ... | ... |
| n | k-(k + 10) | N1-Nn |

For example, when it is detected that the first distance between the center of the flexible display screen and the first user is 18 cm, it is determined whether the current curvature of the flexible display screen is included in a range from B1 to Bn degrees. If not, the current curvature of the flexible display screen is adjusted to a curvature included in the range from B1 to Bn degrees. For example, when the curvature of the flexible display screen is currently A4 degrees, then the curvature of the flexible display screen is adjusted to a curvature included in the range from B1 to Bn degrees. If it is determined that the current curvature of the flexible display screen is included in a range from B1 to Bn degrees, there is no need to adjust the display screen.

In the above embodiment, there are a variety of approaches to detect the first distance between the center of the flexible display screen and the first user. For example, the flexible display screen can be provided with a sound wave detection device. In this case, the first distance between the center of the flexible display screen and the first user can be determined from the time at which a sound wave is emitted and the time at which a reflected sound wave is received. That is, the distance between them can be determined using sound waves. In another example, the distance between them can be determined by means of image detection. In a word, the present application is not limited to any specific approach for detecting the distance and any approach capable of detecting the distance between the center of the flexible display screen and the first user can be applied in the present application.

It is to be noted here that, in another possible embodiment, the target information can indicate distances between a center of the flexible display screen and at least two users and the detection result can indicate at least two distance values between the center of the flexible display screen and the at least two users. In this case, the step of querying the database based on the detection result to determine whether the first curvature is included in the preset range of curvature values corresponding to the detection result includes: querying the database based on the at least two distance values to determine whether the current first curvature of the flexible display screen is included in the preset range of curvature values corresponding to the at least two distance values. Here the database stores a correspondence between a range of distance values and a range of curvature values.

For example, the flexible display screen detects that it is being watched by three users simultaneously (e.g., the flexible display screen may have a number of cameras each monitoring a direction and it can be determined from collective feedbacks from the cameras that the display screen is being watched by three users simultaneously). In this case, the flexible display screen also detects the distances between the center of the flexible display screen and the three users (e.g., User A, User B and User C) are x cm, y cm and z cm, respectively. Then, a weighted average value of the three distance values can be obtained, denoted as w cm. The database can be queried to determine whether the current curvature of the flexible display screen is included in a preset range corresponding to w cm. If not, the curvature of the flexible display screen can be adjusted to a curvature included in the range of curvatures corresponding to w cm.

As in the embodiment described above, the distances can be measured using a distance detection device. The distance detection device can use sound waves and/or captured images to measure the distances. The present application is not limited to any specific approach for detecting the distances and any approach capable of detecting the distances can be applied in the present application.

It is to be noted here that, in another possible embodiment, the target information can indicate a brightness of an environment where the flexible display screen is currently located and the detection result can indicates a current first brightness value. In this case, the step of querying the database based on the detection result to determine whether the first curvature is included in the preset range of curvature values corresponding to the detection result includes querying the database based on the first brightness value to determine whether the current first curvature of the flexible display screen is included in the preset range of curvature values corresponding to the first brightness value. Here, the database stores a correspondence between a range of brightness values and a range of curvature values.

For example, when it is detected that the brightness value increases, i.e., the intensity of light becomes greater, the curvature of the flexible display screen can be increased. On the other hand, when it is detected that the brightness value decreases, i.e., the intensity of light becomes smaller, the curvature of the flexible display screen can be reduced. Of course, this is an illustrative embodiment only. In practice, the desired curvature can be determined depending on actual requirements.

In addition, when the brightness value varies, the backlight luminance of the flexible display screen can be adjusted. That is, when the brightness value increases, i.e., the intensity of light becomes greater, the backlight luminance and contrast can be increased. On the other hand, when the brightness value decreases, i.e., the intensity of light becomes smaller, the backlight luminance and contrast can be reduced.

Moreover, when it is detected that the intensity of light in a particular direction becomes greater suddenly, e.g., the brightness value in the particular direction is very high, an edge of the flexible display screen can be adjusted to be orthogonal to the direction of the stronger light so as to block a part of the strong light. In this way, the picture presented on the display can be clearer, thereby avoiding unclear view of the user due to the strong light.

It can be appreciated that the present application is not limited to any specific approach for detecting the brightness value and any approach capable of detecting the brightness value of the current environment can be applied in the present application.

It is to be noted here that, in another possible embodiment, the target information can indicate a current angle between the flexible display screen and a horizontal plane and the detection result can indicate a first angle value. In this case, the step of querying the database based on the detection result to determine whether the first curvature is included in the preset range of curvature values corresponding to the detection result includes querying the database based on the first angle value to determine whether the current first curvature of the flexible display screen is included in the preset range of curvature values corresponding to the first angle value, the database storing a correspondence between a range of angle values and a range of curvature values.

For example, when it is detected that the value of the angle between the flexible display screen and the horizontal plane becomes larger, the curvature of the flexible display screen can be increased. On the other hand, when it is detected that the angle value becomes smaller, the curvature of the flexible display screen can be reduced. Of course, this is an illustrative embodiment only and the desired curvature can be determined depending on actual requirements.

It can be appreciated that the present application is not limited to any specific approach for detecting the above angle value and any approach capable of detecting the above angle value can be applied in the present application.

It is to be noted here that the above step 103 of adjusting the flexible display screen to the second curvature can include: adjusting the curvature by a predetermined step based on the control command; determining whether the adjusted curvature is included in a preset range; and repeating the adjusting and determining steps until the adjusted curvature is included in the preset range. Alternatively, the above step 103 of adjusting the flexible display screen to the second curvature can include: adjusting the curvature of the flexible display directly to a curvature included in the preset range based on the control command. In other words, the curvature of the flexible display screen can be adjusted gradually in the predetermined step, or directly to a curvature within the preset range.

With the method according to the embodiments of the present invention, the curvature of the flexible display screen can be adjusted as desired, such that a user of the display screen can have an optimized view angle. The present application may solve a problem in the prior art that the curvature of the flexible display screen cannot be adjusted as desired and avoid unclear view of a picture due to view angle.

Figure 2:
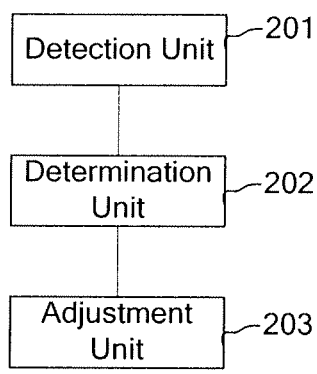
FIG. 2 is a schematic diagram showing a structure of an apparatus for controlling a flexible display screen according to an embodiment of the present invention.

According to an embodiment of the present invention, an apparatus for controlling a flexible display screen is also provided. Referring to FIG. 2, the flexible display screen has a first curvature and the apparatus includes the following units.

A detection unit 201 is adapted to detect target information to obtain a detection result.

A determination unit 202 is adapted to query a database based on the detection result to determine whether the first curvature is included in a preset range of curvature values corresponding to the detection result. The database stores a correspondence between a range of target information values and a range of curvature values.

An adjustment unit 203 is adapted to generate a control command to adjust the flexible display screen to a second curvature different from the first curvature when the first curvature is not included in the preset range of curvature values.

Here, the target information may indicate a distance between a center of the flexible display screen and a first user and the detection result indicates a first distance between the center of the flexible display screen and the first user.

Alternatively, the target information may indicate distances between a center of the flexible display screen and at least two users and the detection result indicates at least two distance values between the center of the flexible display screen and the at least two users.

Alternatively, the target information may indicate a brightness of an environment where the flexible display screen is currently located and the detection result indicates a current first brightness value.

Alternatively, the target information may indicate a current angle between the flexible display screen and a horizontal plane and the detection result indicates a first angle value.

With the apparatus according to the embodiments of the present invention, the curvature of the flexible display screen can be adjusted as desired, such that a user of the display screen can have an optimized view angle. The present application solves a problem in the prior art that the curvature of the flexible display screen cannot be adjusted as desired and avoids unclear view of a picture due to view angle.

Figure 3:
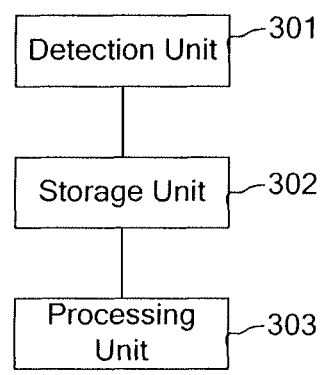
FIG. 3 is a schematic diagram showing a structure of a flexible display screen according to an embodiment of the present invention.

According to an embodiment of the present invention, a flexible display screen is also provided. Referring to FIG. 3 the flexible display screen has a first curvature and includes the following units.

A detection unit 301 is adapted to detect target information to obtain a detection result.

A storage unit 302 has a database storing a correspondence between a range of target information values and a range of curvature values.

A processing unit 303 is adapted to query the database based on the detection result to determine whether the first curvature is included in a preset range of curvature values corresponding to the detection result, and generate a control command to adjust the flexible display screen to a second curvature different from the first curvature when the first curvature is not included in the preset range of curvature values.

Here, when the detection result may indicate a distance, the detection unit uses sound waves and/or captured images for measuring the distance.

With the flexible display screen according to the embodiments of the present invention, the curvature of the flexible display screen can be adjusted as desired, such that a user of the display screen can have an optimized view angle. The present application solves a problem in the prior art that the curvature of the flexible display screen cannot be adjusted as desired and avoids unclear view of a picture due to view angle.

The features described in conjunction with the embodiments of the method also apply to the embodiments of the apparatus and the flexible display screen. Therefore, the embodiments of the apparatus and the flexible display screen are described briefly and, for their details, reference can be made to the above description of the embodiments of the method.

It is to be noted here that the present invention is not limited to any condition for triggering the adjustment of the curvature of the flexible display screen. Any method or approach capable of triggering the adjustment of the curvature can be applied in the method for controlling according to the present invention.

It is to be noted that the relative terms such as "first" and "second" in this context is only used to distinguish one entity or operation from another, but do not require or imply any actual relationship or order between these entities or operations. Further, the terms "including" or "comprising" or any variants thereof are not exclusive, such that a process, method, article or apparatus including/comprising a number of elements may also include/comprise other elements that are not explicitly listed or inherent to the process, method, article or apparatus. If not limited otherwise, an element included in process, method, article or apparatus does not exclude a situation where the process, method, article or apparatus including the element further includes one or more identical elements.

It can be appreciated by those skilled in the art that all or a part of the steps of the method according to the embodiments described above can be implemented by a hardware component with the help of computer program. Here the computer program can be stored in a computer readable medium such as ROM, RAM, magnetic disk or optical disc.

While the preferred embodiments of the present invention have been described above, the present invention is not limited to these embodiments. Any modifications, equivalents or enhancements that are made without departing from the spirit and principle of the present invention are to be encompassed by the scope of the present invention.

What is claimed is:

1. A method for controlling a flexible display screen having a first curvature, comprising:
   detecting target information to obtain a detection result;
   querying a database based on the detection result to determine whether the first curvature is included in a preset range of curvature values corresponding to the detection result, the database storing a correspondence between a range of target information values and a range of curvature values; and
   generating a control command to adjust the flexible display screen to a second curvature different from the first curvature when the first curvature is not included in the preset range of curvature values.

2. The method of claim 1, wherein
   the target information indicates a distance between a center of the flexible display screen and a first user;
   the detection result indicates a first distance between the center of the flexible display screen and the first user; and
   the step of querying the database based on the detection result to determine whether the first curvature is included in the preset range of curvature values corresponding to the detection result comprises:
   querying the database based on the first distance to determine whether the current first curvature of the flexible display screen is included in the preset range of curvature values, the database storing a correspondence between a range of distance values and a range of curvature values.

3. The method of claim 1, wherein
   the target information indicates distances between a center of the flexible display screen and at least two users;
   the detection result indicates at least two distance values between the center of the flexible display screen and the at least two users; and
   the step of querying the database based on the detection result to determine whether the first curvature is included in the preset range of curvature values corresponding to the detection result comprises:
   querying the database based on the at least two distance values to determine whether the current first curvature of the flexible display screen is included in the preset range of curvature values corresponding to the at least two distance values, the database storing a correspondence between a range of distance values and a range of curvature values.

4. The method of claim 2, wherein the distance/distances is/are measured by a distance detection device that uses sound waves and/or captured images for measuring the distance/distances.

5. The method of claim 1, wherein
   the target information indicates a brightness of an environment where the flexible display screen is currently located;
   the detection result indicates a current brightness value; and
   the step of querying the database based on the detection result to determine whether the first curvature is included in the preset range of curvature values corresponding to the detection result comprises:
   querying the database based on the first brightness value to determine whether the current first curvature of the flexible display screen is included in the preset range of curvature values corresponding to the brightness, the database storing a correspondence between a range of brightness values and a range of curvature values.

6. The method of claim 1, wherein
   the target information indicates a current angle between the flexible display screen and a horizontal plane;
   the detection result indicates an angle value; and
   the step of querying the database based on the detection result to determine whether the first curvature is included in the preset range of curvature values corresponding to the detection result comprises:
   querying the database based on the first angle value to determine whether the current first curvature of the flexible display screen is included in the preset range of curvature values corresponding to the angle value, the database storing a correspondence between a range of angle values and a range of curvature values.

7. The method of claim 1, wherein the step of adjusting the flexible display screen to the second curvature comprises:
   adjusting the curvature of the flexible display by a predetermined step based on the control command;
   determining whether the adjusted curvature is included in a preset range;
   repeating the adjusting and determining steps until the adjusted curvature is included in the preset range, or
   adjusting the curvature of the flexible display directly to a curvature included in the preset range based on the control command.

8. An apparatus for controlling a flexible display screen having a first curvature, comprising:

a detection unit adapted to detect target information to obtain a detection result;

a determination unit adapted to query a database based on the detection result to determine whether the first curvature is included in a preset range of curvature values corresponding to the detection result, the database storing a correspondence between a range of target information values and a range of curvature values; and an adjustment unit adapted to generate a control command to adjust the flexible display screen to a second curvature different from the first curvature when the first curvature is not included in the preset range of curvature values.

9. The apparatus of claim 8, wherein the target information indicates a distance between a center of the flexible display screen and a first user and the detection result indicates a first distance between the center of the flexible display screen and the first user, the target information indicates distances between a center of the flexible display screen and at least two users and the detection result indicates at least two distance values between the center of the flexible display screen and the at least two users, the target information indicates a brightness of an environment where the flexible display screen is currently located and the detection result indicates a current first brightness value, or the target information indicates a current angle between the flexible display screen and a horizontal plane and the detection result indicates a first angle value.

10. A flexible display screen having a first curvature, comprising:

a detection unit adapted to detect target information to obtain a detection result;

a storage unit having a database storing a correspondence between a range of target information values and a range of curvature values; and a processing unit adapted to query the database based on the detection result to determine whether the first curvature is included in a preset range of curvature values corresponding to the detection result, and generate a control command to adjust the flexible display screen to a second curvature different from the first curvature when the first curvature is not included in the preset range of curvature values.

11. The flexible display screen of claim 10, wherein the detection result indicates a distance and the detection unit uses sound waves and/or captured images for measuring the distance.

* * * * *